Aug. 23, 1927.

C. ANDRADE, JR 1,639,974

ROLLER CLUTCH

Filed July 12, 1924

2 Sheets-Sheet 1

INVENTOR:

Cipriano Andrade Jr.

Aug. 23, 1927.  C. ANDRADE, JR  1,639,974
ROLLER CLUTCH
Filed July 12, 1924  2 Sheets-Sheet 2

RELATIVELY SOFT LOCKING ROLLERS

INVENTOR
Cipriano Andrade, Jr.

Patented Aug. 23, 1927.

1,639,974

UNITED STATES PATENT OFFICE.

CIPRIANO ANDRADE, JR., OF NEW YORK, N. Y.

ROLLER CLUTCH.

Application filed July 12, 1924. Serial No. 725,549.

My invention relates to roller clutches and the object of my invention is to produce a roller clutch which will give the maximum possible wearing quality.

Figure 1:
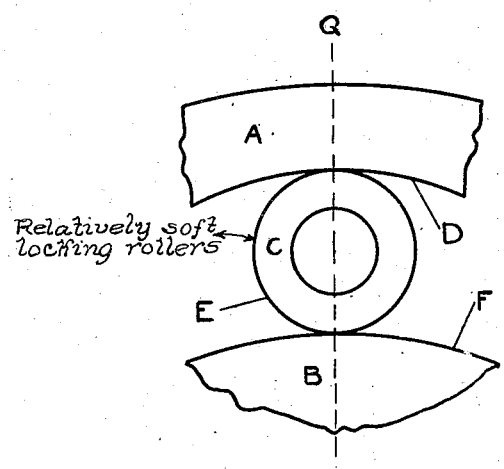
Figure 2:
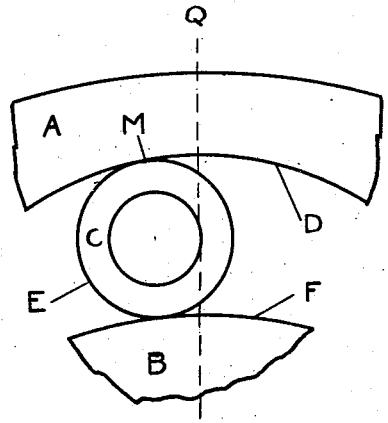
Figure 3:
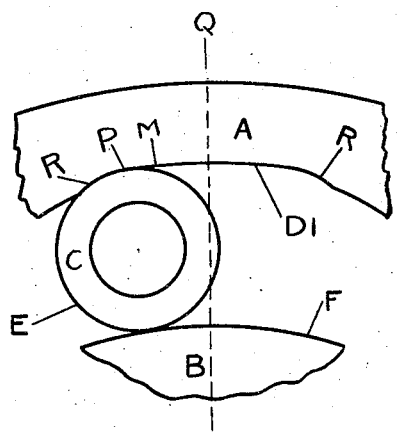
Figure 4:
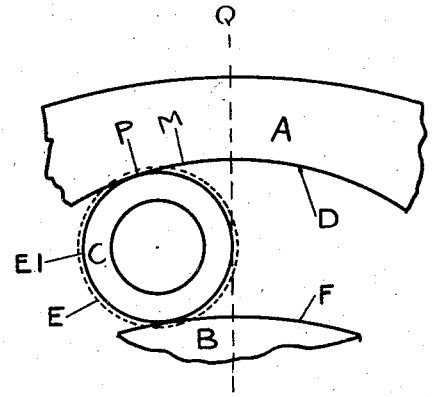
Figure 5:
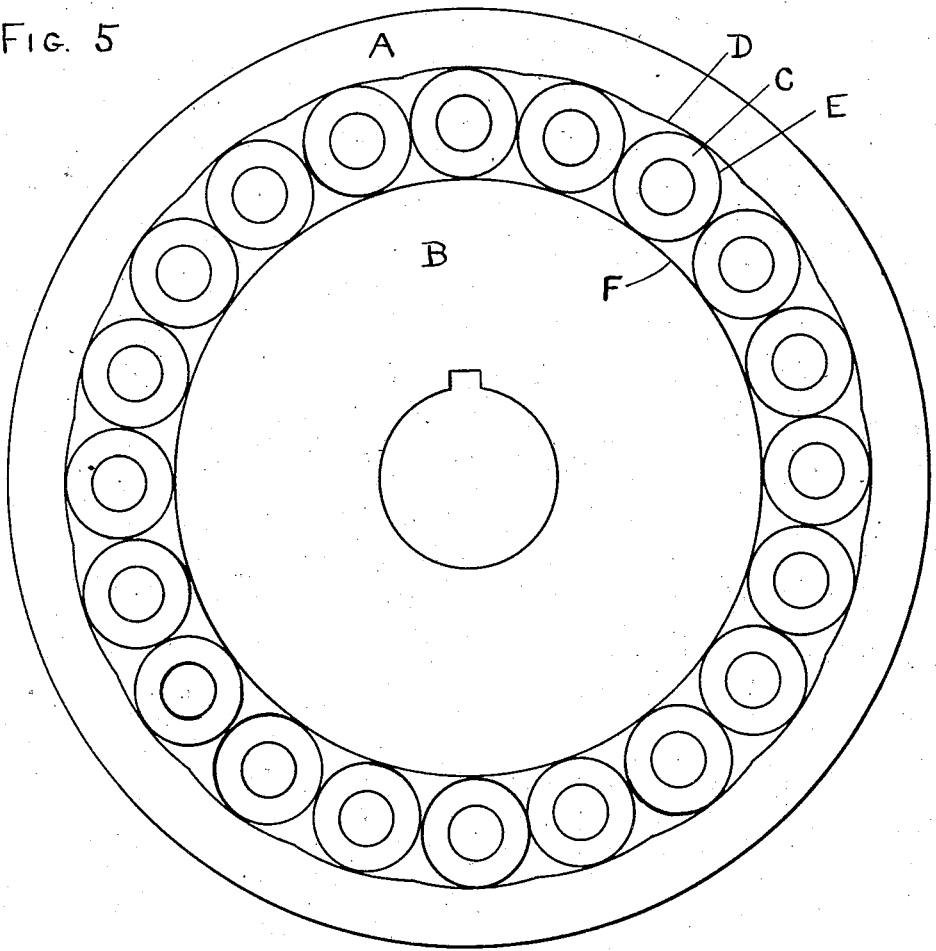

I attain this object by the mechanism illustrated in the accompanying drawings in which:

Fig. 1 is an end view of my device in neutral position; Fig. 2 is an end view of my device in original locking position; Fig. 3 is an end view of the ordinary roller clutch, wherein the rollers are as hard as or harder than the driving member, and the rollers are shown in attempted locking position after considerable use; Fig. 4 is an end view of my improved roller clutch wherein the rollers are softer than the driving member and the rollers are shown in locking position after a substantially longer use than disclosed in Fig. 3; and Fig. 5 is an end view of one form of my device with the rollers all in mutual contact as hereinafter described. The eccentric arcs disclosed in these figures, being adapted to lock the rollers in either direction, are two way clutches, and thus applicable more especially to differentials, but the essential features of my present invention apply also to one way clutches, without departing from my said invention.

Similar letters refer to similar parts throughout the several views.

A is the driving member with eccentric arc D on its inner face. B is the driven member with cylindrical locking surface F. C is the locking roller with cylindrical locking surface E. Q is a radial centre line which passes through the centre of eccentric arc D and the centre of locking surface F. M is the original locking point on the inner face of driving member A before any wear develops on any of the parts. P is a locking point on the inner face of driving member A after wear has begun to develop on any of the parts. $D^1$ is the inner face of driving member A worn by hard roller E into an arc concentric with locking surface F. R are concave arcs further worn into the inner face of driving member A after it has begun to develop wear. These concave arcs R are of the same radius as locking surface E on locking roller C.

The function of my device is as follows:

It will be observed by reference to Fig. 2 that the original locking point M is the only point at which driving member A can sustain the locking contact with roller C. On the other hand, roller C, being free to rotate when in neutral position, locks different points of its locking surface E at point M at different times. The result is that this locking wear is evenly distributed about the entire circumference E of roller C during the numerous lockings and unlockings which occur in actual practice; but during this same period of time, the locking point M is the only place on eccentric arc D which sustains the locking strain for driving member A. The result is that if the metal of roller C is of the same or greater hardness than the metal of driving member A, gradually a wear develops in point M of eccentric arc D, and this wear in eccentric arc D gradually works farther and farther away from centre line Q, and thus the original eccentric arc D is gradually worn into the form $D^1$ of Fig. 3, with the arcs R at the ends of arc $D^1$.

It is of course to be understood that Figs. 2, 3 and 4 show the various parts in position while driving member A is rotating clockwise. When driving member A starts to rotate anti-clockwise, rollers C will lock at the other side of centre line Q, as is well known in the art.

As is well known in the prior art, locking rollers are usually provided with control rods or control elements to create uniformity of circumferential motion, or to limit relative circumferential play, but as this relates to the functioning, and not to the wearing quality, it is omitted from the drawings herein.

When the eccentric arc D has been worn to the form R $D^1$ R shown in Fig. 3, it is found by actual practice that the locking function of the parts is lost, as the arc R in driving member A merely pushes the roller C circumferentially around the surface of driven member B.

In order to overcome this difficulty, my device provides for a roller C made of softer metal than driving member A, and also preferably softer than driven member B as hereinafter explained. When this is done, the wear develops evenly on the surface E of roller C, gradually reducing said surface E to a smaller but constantly true diameter as for example in $E^1$ of Fig. 4. And with this function, when my parts have worn to locking point P, instead of the abnormal and non-functioning surfaces R $D^1$ R of Fig. 3 we retain the normal eccentric locking arc D as shown in Figs. 1, 2 and 4, in connection with a true cylindrical locking roller. It requires much longer to wear roller C of Fig. 4 to locking point P of Fig. 4, than to wear arc D¹ of Fig. 3 to point P of Fig. 3; this for the reason that the distance around the circumference E of roller C is many times as great as the distance from original locking point M to worn locking point P. Therefore a soft roller against a hard driving member will continue to function many times as long as a hard roller against a soft driving member, or a hard roller against a hard driving member, or a soft roller against a soft driving member.

Also it will be observed by reference to the Figs. 1, 2, 3, and 4 that if the locking rollers are in contact with each other as disclosed by my pending application Serial No. 625,333, then the sum of all the circumferences E of locking rollers C will largely exceed the circumference F of driven member B, and therefore the rollers C should be softer than the driven member B, for the same reason that rollers C should be softer than driving member A.

I claim:

1. In a roller clutch; a driving member; a driven member; and a locking roller of softer metal than the driving member and of softer metal than the driven member.

2. In a roller clutch; a driving member with a recess on its locking surface; a driven member; and a locking roller between said recess of the driving member and said driven member, said locking roller being of softer metal than said driving member and of softer metal than said driven member.

3. In a roller clutch; a driving member; a driven member; and a locking roller of softer metal than the driven member.

CIPRIANO ANDRADE, Jr.